United States Patent
Tuschy et al.

(10) Patent No.: US 6,725,665 B2
(45) Date of Patent: Apr. 27, 2004

(54) METHOD OF OPERATION OF GAS TURBINE HAVING MULTIPLE BURNERS

(75) Inventors: Ilja Tuschy, Heidelberg (DE); Peter Keller-Sornig, Baden (CH)

(73) Assignee: ALSTOM Technology Ltd, Baden (CH)

( * ) Notice: Subject to any disclaimer, the term of this patent is extended or adjusted under 35 U.S.C. 154(b) by 0 days.

(21) Appl. No.: 10/230,173

(22) Filed: Aug. 29, 2002

(65) Prior Publication Data

US 2003/0145598 A1 Aug. 7, 2003

Related U.S. Application Data

(60) Provisional application No. 60/353,196, filed on Feb. 4, 2002.

(51) Int. Cl.$^7$ ................................................ F02C 6/16
(52) U.S. Cl. ............................ 60/776; 60/727; 60/39.21
(58) Field of Search ........................ 60/776, 727, 39.21, 60/773

(56) References Cited

U.S. PATENT DOCUMENTS

| | | |
|---|---|---|
| 4,058,975 A | 11/1977 | Gilbert et al. |
| 4,455,820 A | 6/1984 | Buckley, Jr. et al. |
| 4,735,052 A | 4/1988 | Maeda et al. |
| 5,097,659 A * | 3/1992 | Lampe et al. ............... 60/39.27 |
| 5,319,931 A | 6/1994 | Beebe et al. |
| 5,533,329 A | 7/1996 | Ohyama et al. |
| 6,247,300 B1 | 6/2001 | Muramatsu et al. |
| 6,338,240 B1 | 1/2002 | Endo et al. |
| 2001/0047650 A1 | 12/2001 | Muller et al. |

FOREIGN PATENT DOCUMENTS

| | | |
|---|---|---|
| DE | 888 335 | 8/1953 |
| EP | 1 077 349 A1 | 2/2001 |
| EP | 0684370 B1 | 1/2002 |
| GB | 1 388 404 | 3/1975 |
| GB | 2 323 428 | 9/1998 |

* cited by examiner

*Primary Examiner*—Ehud Gartenberg
(74) *Attorney, Agent, or Firm*—Burns, Doane, Swecker & Mathis, L.L.P.

(57) ABSTRACT

The invention provides a method of operating a gas turbine arranged in a power generation system and comprising a source of compressed air, a combustor having a combustion chamber and multiple burners. A gas turbine controller controls the activation and deactivation of the single burners and/or burner groups according to a switching criterion that is proportional to the difference between a combustion chamber air inlet temperature and a temperature downstream of the combustion chamber. The switching criterion according to the invention fully accounts for large temperature fluctuations of the combustion chamber inlet air, which then result in only relatively small variations in burner equivalence ratio. The invention is particularly suited for application in compressed air energy power generation plants.

11 Claims, 3 Drawing Sheets

Switching Criterion for Burners
$K_S = T_{GT\ TIT} - T_{CC\ inlet}$

Switching Criterion for Burners
$K_S = T_{GT\ TIT} - T_{CC\ inlet}$

METHOD OF OPERATION OF GAS TURBINE HAVING MULTIPLE BURNERS

This application claims priority from U.S. Provisional Application No. 60/353,196 filed with the U.S. Patent and Trademark Office on Feb. 4, 2002.

FIELD OF THE INVENTION

The invention pertains to a method of operating gas turbines, as for example in conventional gas turbine power plants or a compressed air energy storage (CAES) system, and in particular to a method of operating gas turbines having multiple burners.

BACKGROUND OF THE INVENTION

The layout of a conventional gas turbine power plant with a compressor is generally known.

The layout of an example of a compressed air energy storage (CAES) system is shown schematically in FIG. 1. It comprises a cavern 1 for the storage of compressed air used for in particular for the generation of power during high demand periods. The compressed air is admitted by the control of a valve arrangement 9 to a recuperator 2 where it is heated by heat transfer from exhaust from the gas turbine. A further valve arrangement 8 controls the admission of the compressed air to an air turbine 3. A combustion chamber 4 and gas turbine 5 are arranged downstream of the air turbine 3. An auxiliary burner 6 is arranged following the gas turbine 5 and before the recuperator 2. In this CAES arrangement the gas turbine combustion chamber 4 comprises multiple burners. When the gas turbine 5 is operated at various combustion chamber heat loads the number of active burners is varied. An automatic activation or deactivation of individual burners or burner groups by means of a gas turbine controller requires one criterion or several criteria that define the switch points for the burners. For example, this criterion can be the gas turbine load.

For premixed combustion taking place in a gas turbine combustion chamber the combustion event can be characterized by the equivalence ratio $\Phi$ given by the ratio of the mass flow rate of fuel to that of oxidizer where the oxidizer usually is air. This is expressed by equation 1:

$$\Phi = afr\frac{\dot{m}_{fuel}}{\dot{m}_{ox}}$$

The factor afr (abbreviation for air fraction, generally the oxidizer being air) is the ratio of oxidizer mass flow to fuel mass flow for stoichiometric combustion, i.e. for a complete chemical reaction, where neither oxidizer nor fuel residuals are present in the exhaust gas.

By definition the equivalence ratio $\Phi$ can take on any value between zero and infinity. However, for technical combustion the range is given by the flame stability limits. These limits are approached when the reaction cannot release enough heat to sustain chemical reaction and the flame subsequently extinguishes. This can happen if either excessive oxidizer or fuel is present. In the first case, the stability limit is defined as the "lean extinction limit".

The combustion emissions, in particular NOx, correlate strongly with the flame temperature. Flame temperature and hence emissions can be controlled by varying the amounts and distribution of fuel and oxidizer in the combustion chamber.

For a gas turbine having multiple burners, a single burner equivalence ratio $\Phi_{SB}$ is given by equation 2:

$$\Phi_{SB} = afr\frac{\dot{m}_{fuel,SB}}{\dot{m}_{air,SB}}.$$

It is an important indicator of flame temperature, combustion stability and emissions. Furthermore, a combustion chamber equivalence ratio is defined by equation 3:

$$\Phi_{CC} = afr\frac{\dot{m}_{fuel,CC}}{\dot{m}_{air,CC}}$$

The value of $\Phi_{CC}$, together with the combustion chamber air inlet temperature and the fuel temperature, determines the firing temperature of the combustion chamber.

In a similar manner, the gas turbine equivalence ratio $\Phi_{GT}$ is related to the gas turbine inlet mix temperature $T_{GT\ TIT}$, which is an important parameter of the overall gas turbine operation. This equivalence ratio is given by equation 4:

$$\Phi_{GT} = afr\frac{\dot{m}_{fuel,GT}}{\dot{m}_{air,GT}}.$$

The gas turbine air mass flow, the combustion chamber air mass flow and the air admission to one single burner are determined, in part, by the gas turbine design geometry. The gas turbine fuel mass flow is identical to the combustion chamber fuel flow. The ratio of one single burner's fuel flow to the combustion chamber fuel mass flow is, however, dependent on the number n and configuration of the active burners. Hence, the different equivalence ratios are closely related by $$\Phi_{CC} = f(\Phi_{GT}), \text{ and} \quad \text{equation 5}$$

$$\Phi_{SB} = f(\Phi_{CC}, n). \quad \text{equation 6}$$

In gas turbine combustion chambers with multiple burners, the burner technology is preferably geared to, but not limited to a lean combustion technology reducing emissions. The combustion chamber's burners are switched on and off individually or are arranged in separately switchable burner groups. In order to achieve stable combustion and low emissions, the number of individual burners or burner groups in operation are varied over the range of operation.

Switching burners on or off with a constant $\Phi_{GT}$ distributes a certain amount of fuel to the burners leading to a shift in the burner equivalence ratio $\Phi_{SB}$. If the number of active burners is reduced, the burner equivalence ratio $\Phi_{SB}$ will increase and consequently higher flame temperatures and higher emissions will occur. On the other hand, the activation of further burners will reduce the equivalence ratio $\Phi_{SB}$. If the combustion process operates too closely to the extinction limit prior to the switch, some or even all burners will extinguish.

In conventional gas turbines load changes during start-up, shutdown or load following mode are accomplished by changing the air and/or fuel mass flow. In case of a load increase, relevant changes in the combustion chamber can occur such as:

The gas turbine inlet mix temperature $T_{GT\ TIT}$ and/or the air mass flow increases.

The combustion chamber heat load increases (given by the product of combustion chamber air mass flow and the temperature difference between combustion chamber air inlet temperature and combustion chamber exhaust outlet temperature).

The total fuel mass flow into the combustion chamber increases with the heat load.

The combustion chamber equivalence ratio $\Phi_{CC}$ increases with the temperature difference between combustion chamber air inlet temperature and combustion chamber exhaust outlet temperature.

Basically the operation of the combustion chamber can respond to an increased heat load in three ways. More fuel is added with either a reduced, same, or increased number of active burners.

Whenever the combustion chamber equivalence ratio $\Phi_{CC}$ increases, a constant or even reduced number of burners will result in a higher burner equivalence ratio $\Phi_{SB}$. Hence, if the number of burners is not increased in order to compensate for the increased $\Phi_{CC}$, emissions and single burner heat load will increase. But even if $\Phi_{CC}$ does not change, the higher heat load may allow for burner operation closer to the lean extinction limit. Hence, switching on additional single burners when increasing the gas turbine load may be advantageous to reduce emissions and heat load of the single burners. A reduced single burner heat load will, in turn, reduce the thermal stress of single burners.

FIG. 2 shows several gas turbine temperatures that are of interest concerning the operation of a gas turbine and its combustion chamber. Herein the temperature of the premixed flame can be found at position 10. The combustion gases are cooled down by air bypassing the main reaction zone and reentering the combustion chamber at position 20. The so-called "firing temperature" is defined as the temperature directly upstream of the turbine's first vane row at position 30. This temperature and the temperature upstream of the first moving blade row at position 40 are limited with respect to the vane and blade material. To ensure their mechanical integrity both vanes and blades of modern gas turbines are usually cooled with air or steam. The temperature that would be found, if all the cooling media were mixed with the combustion chamber exhaust gases, is defined as the gas turbine inlet mix temperature $T_{GT\ TIT}$. This temperature cannot be measured, however it can be determined by calculation.

Criteria are needed to define the burner or burner group switch points in a gas turbine control program. The burner switch must comply with low emission requirements without endangering combustion stability or risking sudden flame loss by extinction. Theoretically, the equivalence ratio is a suitable criterion to determine burner switches.

The equivalence ratio according to equation 1 is a normalized ratio of fuel and oxidizer mass flow. However, in order to use this ratio as a switching criterion, the fuel and oxidizer mass flows at the burners must be known.

In an open gas turbine cycle, the oxidizer mass flow that is discharged by the compressor cannot be measured. A theoretical prediction is possible, however, it is not reliable for the oxidizer mass flow through the burners for the following reasons The compressor discharge mass flow and temperature change according to ambient conditions, where ambient temperature and pressure are most relevant, the compressor discharge mass flow as well as the temperature can change with time due to compressor aging and fouling.

Therefore, a reliable prediction of the burner oxidizer flow is limited in practice, and the equivalence ratio is not a suitable criterion for determining the burner switch points. Other criteria describing the combustion in the burner or the combustion chamber, such as for example the temperature increase of single burners, gas turbine inlet temperature, are also based on the compressor mass flow and hence are also not suitable.

All criteria involving the chemical reaction require knowledge of the oxidizer mass flow through the burner. However, the criterion to determine burner switches must be measurable or calculable with high accuracy.

Such a criterion is the gas turbine load, which can be easily measured at the generator terminal. However, in the application of this criterion variations in the compressor discharge temperatures and/or mass flow must also be taken into consideration in the control of the combustion process.

SUMMARY OF THE INVENTION

It is the objective of this invention to provide a method of operating a gas turbine in which burner switch points are determined by a criterion that circumvents the disadvantages described in the state of the art.

The invention pertains to a method of operating a gas turbine arranged in a power generation system and comprising a source of compressed air, a combustor having a combustion chamber and multiple burners. In the method, a gas turbine controller controls the activation and deactivation of the burners according to a switch point criterion that is proportional to the difference between the temperature of compressed air upstream of the combustion chamber and the temperature of the exhaust downstream of the combustion chamber. The temperature of the compressed air upstream of the combustion chamber is preferably that immediately before the combustion chamber. In the case that the power generation system is a compressed air energy storage system, this temperature can also be the temperature at a point before the air turbine or even before the recuperator. The exhaust temperature downstream of the combustion chamber is the temperature of the exhaust at any point downstream of the point at which the chemical reaction has been completed.

In a particular method according to the invention the temperature downstream of the combustion chamber is the gas turbine inlet mix temperature, which is a virtual temperature calculated from a mixture of the exhaust gases and cooling media. These cooling media are admitted to one or more of the following, burners, combustion chamber, and gas turbine. The temperature difference for the switching criterion may then be expressed by $K_S$, which signifies the difference between the gas turbine inlet mix temperature and the combustion chamber inlet temperature of the compressed air and is expressed by the following equation 7:

$$K_S = (T_{GT\ TIT} - T_{CCinlet}).$$

This temperature $K_S$, difference is physically related to various equivalence ratios of the combustion process. For example, it is proportional to the equivalence ratio $\Phi_{CC}$ in the combustion chamber, that is to the ratio of the fuel mass flow rate to the air mass flow rate through the combustion chamber, according to equation 8:

$$\Phi_{CC} \propto \frac{\dot{m}_{fuel}}{\dot{m}_{air}} \propto (T_{GT\ TIT} - T_{CCinlet})$$

As well as to the equivalence ratio of the gas turbine, according to equation 9:

$$\Phi_{GT} \propto \Phi_{CC} \propto \frac{\dot{m}_{fuel}}{\dot{m}_{air}} \propto (T_{GT\ TIT} - T_{CCinlet})$$

Furthermore, the criterion is also related to the single burner equivalence ratio $\Phi_{SB}$ via the number n of active burners as expressed by equation 6.

To apply the proposed concept, the gas turbine inlet mix temperature $T_{GT\ TIT}$, for example according to ISO 2314 standard, must be known. This temperature cannot be measured, but must be calculated, for example from a combustion chamber energy balance. For an accurate calculation, the air mass flow through the combustion chamber must be known.

If the air mass flow admitted to the gas turbine can be measured with high accuracy, the switching criterion according to the invention is advantageous. Therefore, application of the criterion is fully applicable in CAES power plants, as shown in FIG. 1, into which air is admitted from the cavern 1 and where an accurate measurement of air mass flow to the combustion chamber is possible. In a CAES power plant as outlined in FIG. 1, variations in the compressor discharge temperature are equivalent to changes in the air turbine exit temperature. These might occur if the air turbine inlet temperature has changed due to fluctuations in duct burner power.

An application of the switching criterion in conventional gas turbines is limited by the fact that the air mass flow from the compressor to the gas turbine is not reliably predictable.

The switching criterion according to the invention is applicable to the activation and deactivation of single burners as well as groups of individual burners.

In a particular variant of the method the burners are activated and deactivated in order to vary and control the heat load of the burners. This allows, for example, a limitation of the heat load in regard to the lean extinction limit or to permissible emission levels.

By the method of operating a gas turbine according to the invention, changes in temperature of the compressor discharge or of the compressed air from a storage cavern that has been led through a recuperator and air turbine is taken into direct account in the control of the individual burners or groups of burners. By this method those disadvantages are avoided that are typically encountered in power plants whose burners are controlled by a switching criterion based on the load. Specifically, as a result of the activation and deactivation of the burners according to the switching criterion disclosed here, the equivalence ratios of the combustion process vary within a smaller range for a given range of temperature variation of the compressed air admitted to the combustion chamber. The smaller range of values of the equivalence ratios allow a greater flexibility in the design of the combustion chamber and a greater range for the operating parameters. Furthermore, critical operating ranges in regard to emissions and lean extinction limit are less likely to be reached.

Figure 3:
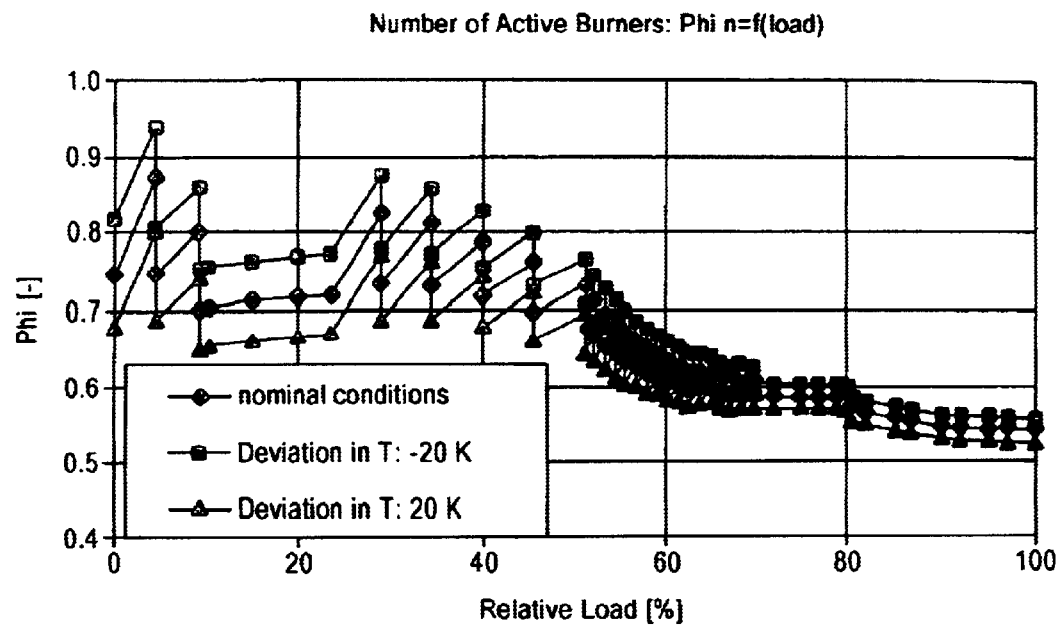
FIG. 3 shows a graph of single burner equivalence ratio for a CAES gas turbine where the number of activated burners is determined according to the relative load criterion.
Figure 4:
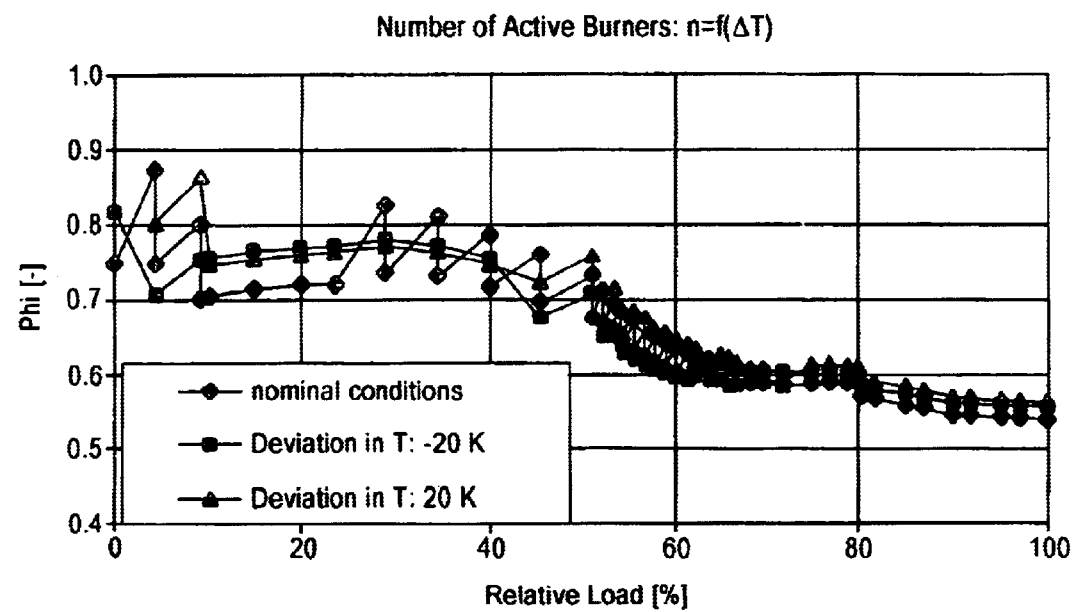
FIG. 4 shows a similar graph as in FIG. 3. However, the number of activated burners is determined according to the switching criterion according to the invention.

The new criterion fully circumvents the disadvantages involved with a switching criterion according to the state of the art. The improved method of operation of a CAES gas turbine is demonstrated in FIGS. 3 and 4, which show the variations in the single burner equivalence $\Phi_{SB}$ or Phi where the number of burners activated is determined by a switching criterion according to the relative load and according to the invention respectively. A comparison of 3 and 4 reveals that by use of the switching criterion according to the invention, the spread in burner equivalence ratio $\Phi_{SB}$ or Phi is significantly reduced over the entire load range. A reduction in the spread of the ratio has the following advantages:

Lower emissions in cases of reduced combustion chamber inlet temperature, higher combustion stability as low single burner equivalence ratios are prevented, the combustion chamber operational concept can be more readily optimized. In particular, it is no longer necessary to operate far from the lean extinction limit, The concept fully recognizes degradation of air turbine or gas turbine efficiency. Reduced efficiencies have no impact on the load switch point criterion and thereby do not affect the number of active burners, unless the combustion chamber operation conditions have changed.

Figure 1:
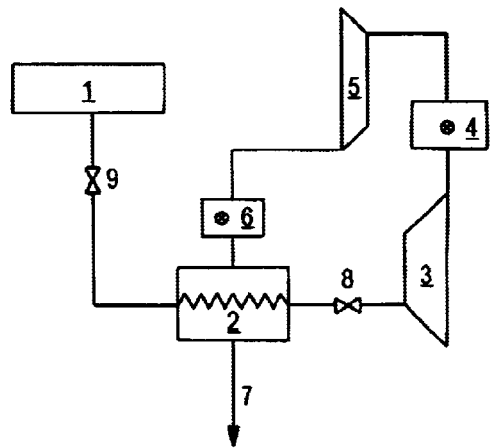
FIG. 1 shows a typical CAES power plant layout.
Figure 2:
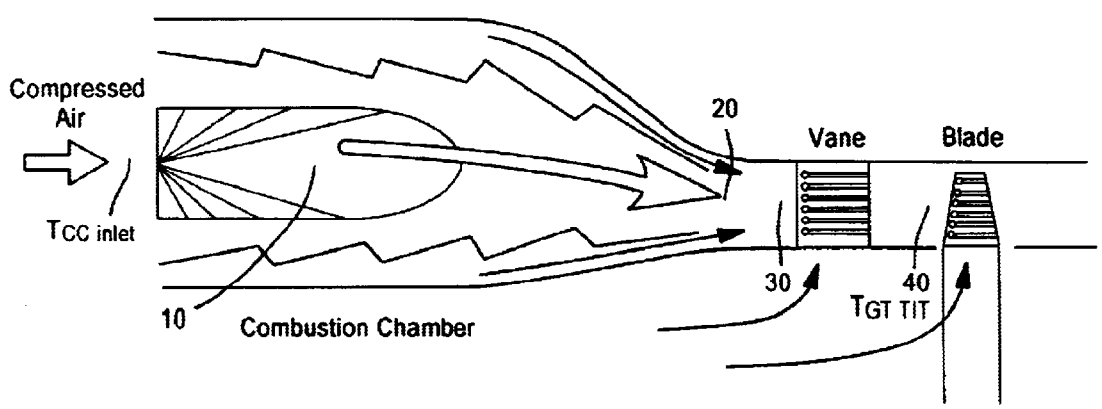
FIG. 2 shows gas turbine combustion temperatures significant to operation methods.

The advantage of the switching criterion according to the invention is particularly significant for gas turbine applications with large variations in combustion chamber air inlet temperature. In conventional gas turbines, variations are determined by weather changes over the year. In a CAES cycle with a recuperator as depicted in FIG. 1, the fluctuations of the combustion chamber air inlet temperature are much larger.

Figure 5:
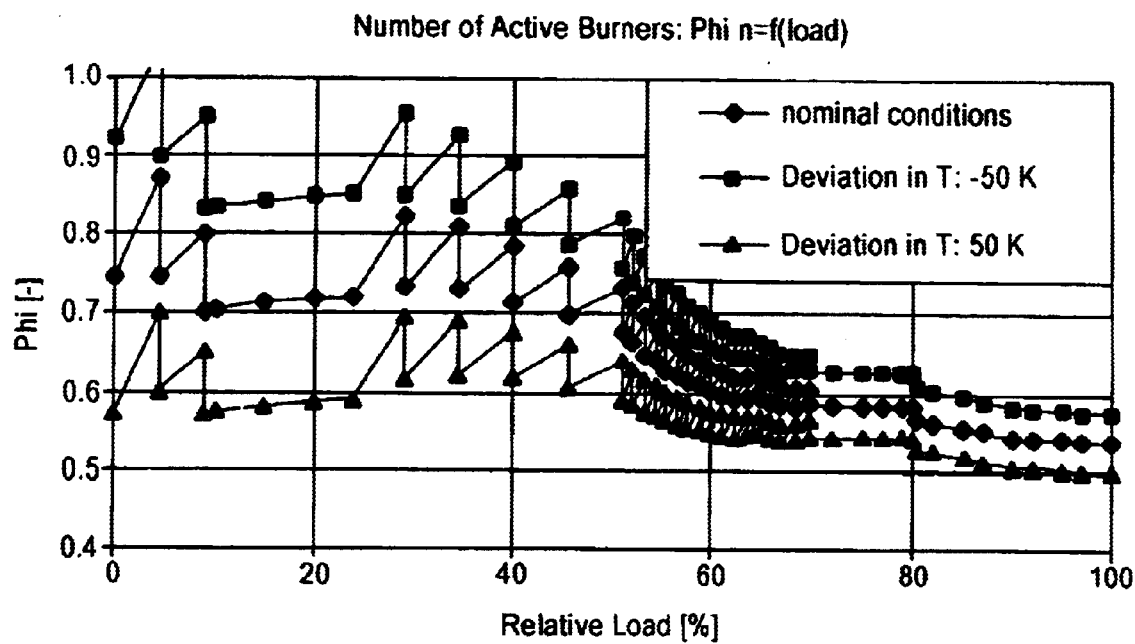
FIG. 5 shows a graph of single burner equivalence ratio for a CAES gas turbine where the number of activated burners is determined according to the relative load criterion and for the particular case where the combustion chamber air inlet temperature deviates over a range of ±50° C.

FIG. 5 shows the impact of deviations of ±50° C. in combustion chamber air inlet temperature on the variation of the single burner equivalence ratio for a CAES gas turbine operated with a switching criterion according to the relative load. In this case, the single burner equivalence ratio fluctuates to an unacceptable degree. Consequently, operational limitations for the power plant must be tighter, which reduces operational flexibility.

Figure 6:
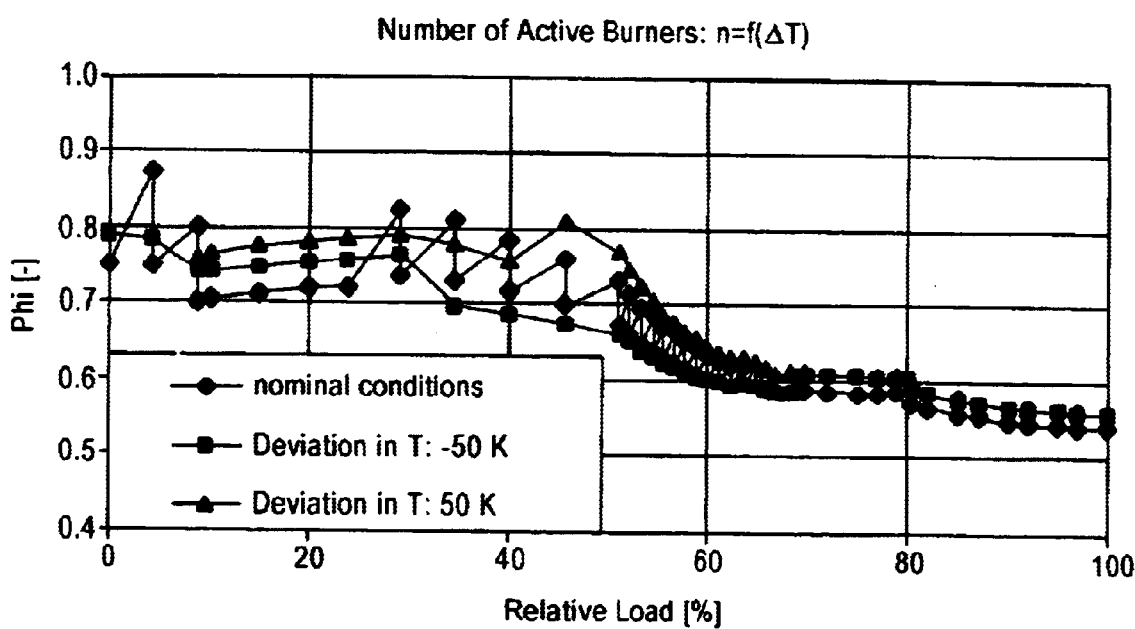
FIG. 6 shows a similar graph as in FIG. 5. However, in this case the burners are activated using the switching criterion according to the invention.

In comparison, FIG. 6 shows the variations of the single burner equivalence ratio in the case of the same large variations in combustion chamber air inlet temperature of ±50° C. but for a CAES gas turbine operated with the switching criterion according to the invention. As the switching criterion according to the invention fully accounts for temperature fluctuations, including large fluctuations, these temperature deviations result in only relatively small variations in single burner equivalence ratio Phi. As a result, the combustion chamber imposes fewer limitations on the power plant operation, which yields greater overall operational flexibility for the plant.

Terms Used in Figures

1 Compressed air storage cavern
2 recuperator
3 air turbine
4 combustion chamber
5 gas turbine
6 auxiliary burner
7 stack
8 air inlet valve arrangement
9 valve arrangement

What is claimed is:

1. Method of operating a gas turbine arranged in a power generation system comprising
   a source of compressed air, a combustor having a combustion chamber, and
   a plurality of burners, and
   a gas turbine controller that activates and deactivates the burners according to a switching criterion
   wherein the switching criterion is proportional to a difference between a temperature of the compressed air upstream of the combustion chamber and the temperature of the combustion chamber exhaust downstream of the combustion chamber.

2. Method of operating a gas turbine according to claim 1 wherein the burners are activated and deactivated individually and/or in groups.

3. Method of operating a gas turbine according to claim 1 wherein the burners are activated and deactivated in order to vary and limit the heat load of the burners.

4. Method of operating a gas turbine according to claim 1 wherein cooling media are admitted to the burners, the combustion chamber, and/or the gas turbine.

5. Method of operating a gas turbine according to claim 1 wherein the said switching criterion is the temperature difference between the combustion chamber air inlet temperature immediately before the entry to the combustion chamber and the temperature of the combustion chamber exhaust at any point downstream from the point in the combustion chamber where the chemical combustion reaction is complete.

6. Method of operating a gas turbine according to claim 1 wherein the temperature downstream of the combustion chamber is the gas turbine inlet temperature.

7. Method of operating a gas turbine according to claim 1 wherein the temperature downstream of the combustion chamber is a virtual temperature $T_{GT\ TIT}$ calculated for a mixture of combustion chamber exhaust gases and cooling media admitted to the burners, combustion chamber and/or gas turbine.

8. Method of operating a gas turbine according to claim 7 wherein said switching criterion is proportional to an equivalence ratio $\Phi_{CC}$ of the combustion chamber, which is defined by the ratio of the fuel mass flow rate to the air mass flow rate through the combustion chamber and the fuel's stoichiometric oxidizer to fuel ratio.

9. Method of operating a gas turbine according to claim 7 wherein the switching criterion is proportional to the equivalence ratio $\Phi_{GT}$ of the gas turbine which is defined by the ratio of the fuel mass flow and the total air mass flow admitted to the gas turbine and the fuel's stoichiometirc oxidizer to fuel ratio.

10. Method of operating a gas turbine according to claim 7 wherein the switching criterion is proportional to the equivalence ratio $\Phi_{SB}$ of a single burner which is defined by the ratio of the fuel mass flow and the total air mass flow admitted to the single burner and the fuel's stoichiometric oxidizer to fuel ratio.

11. Method of operating a gas turbine according to claim 1 wherein the gas turbine is arranged in a compressed air energy storage power generation system.

* * * * *